March 6, 1951 L. B. CORBETT 2,543,895
COATING DEVICE FOR ENGRAVED CYLINDERS
Filed Dec. 28, 1946 4 Sheets-Sheet 1
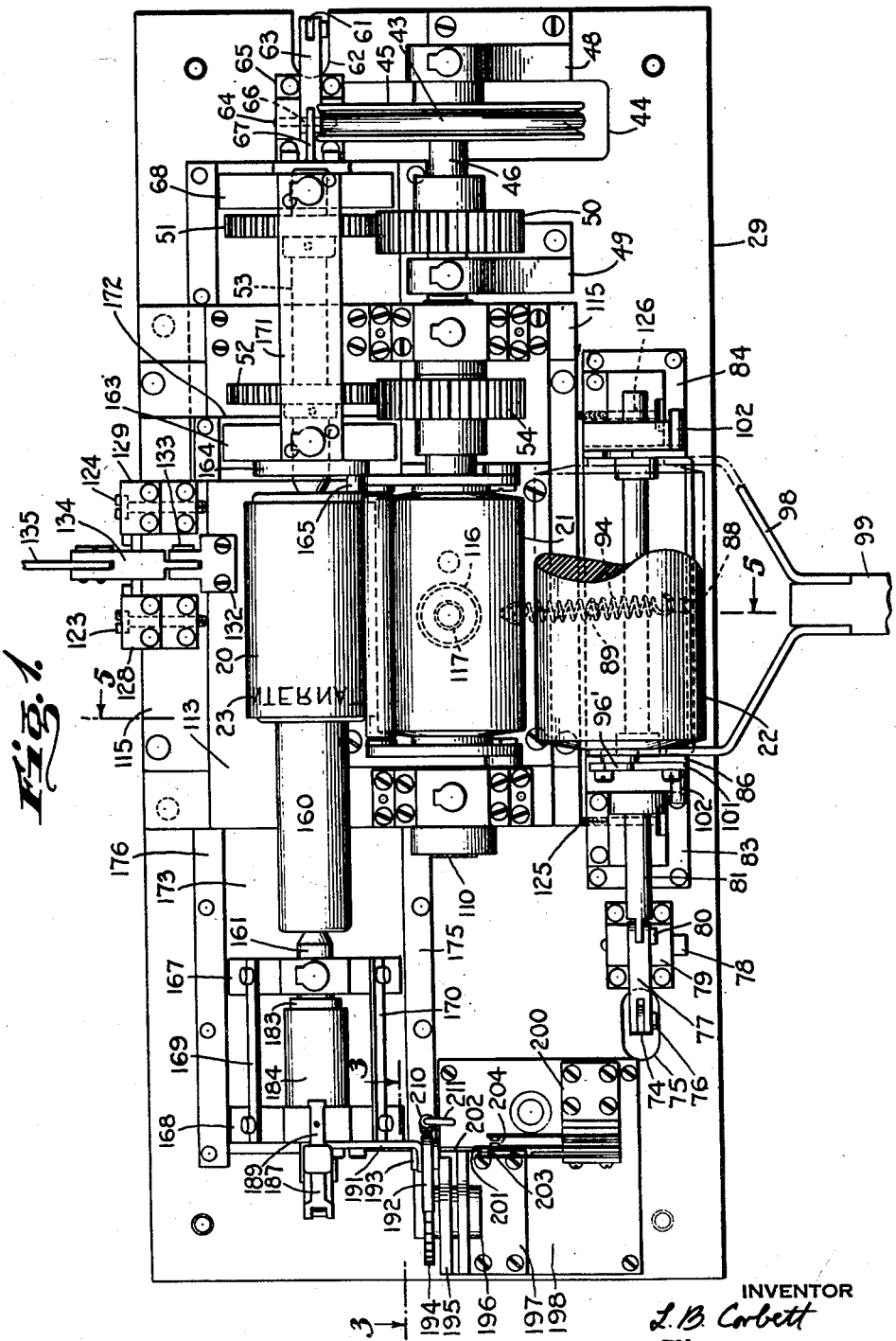
INVENTOR
L. B. Corbett
BY
J. W. Armbruster
ATTORNEY

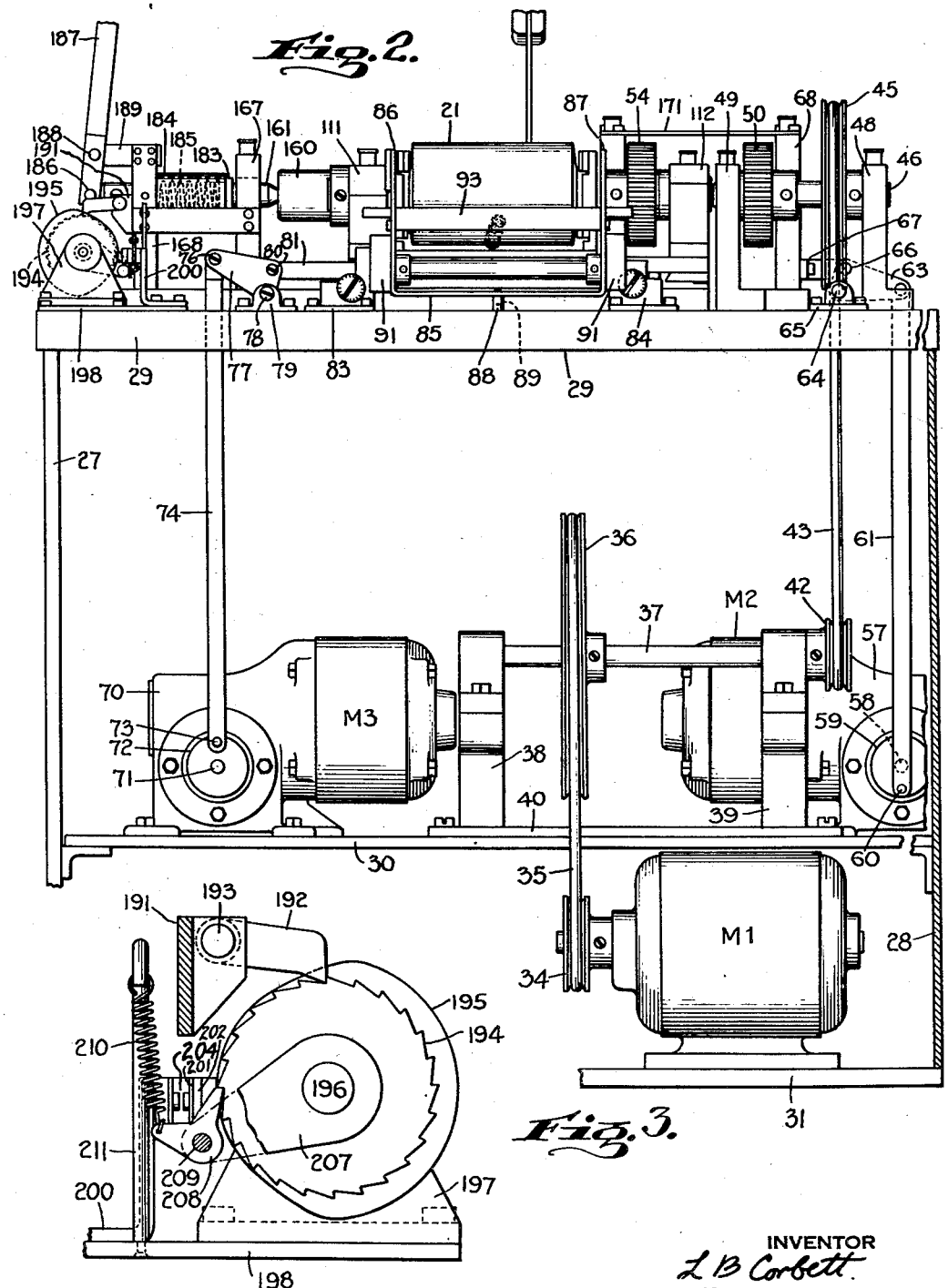

March 6, 1951  L. B. CORBETT  2,543,895
COATING DEVICE FOR ENGRAVED CYLINDERS
Filed Dec. 28, 1946  4 Sheets-Sheet 3

INVENTOR
L B Corbett
BY
J W Armbruster
ATTORNEY

March 6, 1951     L. B. CORBETT     2,543,895
COATING DEVICE FOR ENGRAVED CYLINDERS
Filed Dec. 28, 1946     4 Sheets-Sheet 4

INVENTOR
L B Corbett
BY
J W Armbruster
ATTORNEY

Patented Mar. 6, 1951

2,543,895

UNITED STATES PATENT OFFICE 2,543,895

COATING DEVICE FOR ENGRAVED CYLINDERS

Lawrence B. Corbett, Binghamton, N. Y., assignor to International Business Machines Corporation, New York, N. Y., a corporation of New York Application December 28, 1946, Serial No. 719,011

7 Claims. (Cl. 91—50)

This invention relates in general to devices for preparing printing surfaces and more specifically to means for coating the raised surfaces and side walls of said surfaces on an engraved printing plate before said plate is reetched.

An object of the invention is to provide devices for automatically recoating raised engraved surfaces and the side walls of such surfaces on an electro roller or engraved cylinder preparatory to reetching such a roller or cylinder.

In the production of electro rollers or engraved cylinders, the first etching operation is produced by any one of several well known means, such as photoengraving, whereby the cylinder is prepared with raised printing areas. It is then desired to reetch the cylinder to deepen the etched areas and make the printing surfaces stand proud in order to produce sharper printed detail of the characters and elimination of smudging by intermediate areas. Before reetching can be done, the cylinder must be recoated or "reinked" to insure that the raised surfaces are unaffected and maintained while the unused areas are etched away and lowered still further by the second etching operation. Not only is it necessary to coat the top surfaces of the raised areas of the cylinder, but the side walls of such areas must also be coated to prevent undercutting of the raised areas by the etching fluid. It is important to maintain the side walls of the character and line areas intact in order to preserve the smooth curved shapes and the sharp straight outlines of the printed characters, even after the cylinder has been used a long time and worn or reground.

Heretofore, for the protective coating of the raised cylinder areas and side walls thereof, it was necessary to brush on the coating fluid or ink by hand with strokes in all different directions to insure that all side walls, in whatever direction they were facing, were covered with the protecting coat. It was difficult to apply fluid at a uniform rate in all side directions so that the ink creeping out from the base of the high portions would not go further in one direction than in another. This hand inking operation was a tedious, time-consuming, and expensive task which is eliminated by the automatic reinking devices of the present invention.

Therefore, an object of the invention is to provide means for applying coating material in all directions on trio dimensional raised portions of a printing plate.

Another object is to provide devices for applying coating material on raised engraved surfaces in all four directions at a uniform rate on all sides of all side walls of the engraved surfaces so that said material creeps down said walls at a uniform rate.

Another object of the invention is to provide an improved method of coating or inking an object with raised portions.

Another object of the invention is to provide means for moving a printing plate and a cooperating coating transfer means in all directions relative to each other so that the coating material is applied from all angles.

Another object of the invention is to provide means for reversibly rotating and axially reciprocating an electro roller or cylinder relative to a coating transfer means.

Another object of the invention is to provide means for reversibly rotating and bodily sliding an ink transfer means relative to an engraved cylinder.

Another object of the invention is to provide gearing for rotating an engraved cylinder and a coating transfer roller together in contact, but at different peripheral speeds to cause a wiping application of the coating material.

Another object of the invention is the provision of means for reversibly rotating, axially reciprocating, angularly rocking and shifting an ink supply roller relative to the cooperating transfer roller. The two rollers are proportioned with different outside diameters to avoid repetitious contact of the same areas.

Another object of the invention is the provision of means for cooperatively associating an etched roller, an ink supply roller, and a transfer roller between the other two rollers, said transfer roller being manipulatively engaged with either or both of the other rollers.

A still further object of the invention is the provision of means for cooperatively associating an engraved cylinder roller and an ink supply roller with a transfer roller between them, and means for oscillating and axially reciprocating both engraved and supply rollers, so that all surfaces of said rollers are shifted with respect to the contacting surfaces.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a plan view showing the three rollers and the cooperating control mechanism.

Fig. 2 is a front elevation view showing the driving mechanism and the connections therefrom to the controls for moving the various rollers.

Fig. 3 is a detail sectional elevation view taken along line 3—3 of Fig. 1 and showing the ratchet and pawl mechanism for operating a cam for closing reversible contacts to change automatically the direction of rotation of the rollers in the machine.

Figure 5:
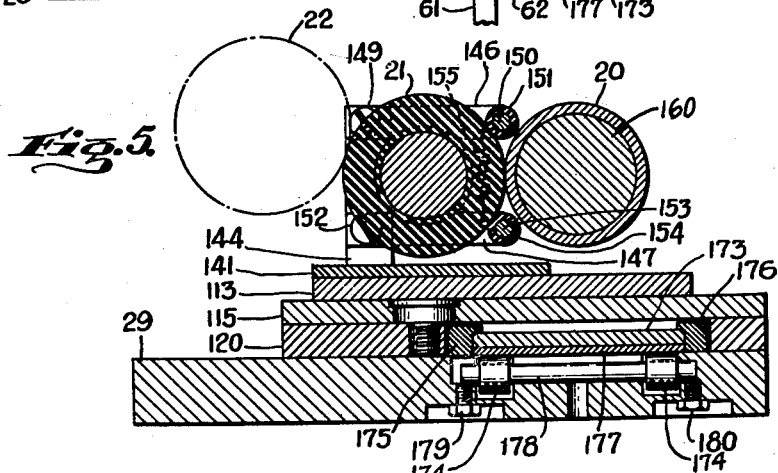
Fig. 5 is a sectional elevation view taken along line 5—5 in Fig. 1 and showing the construction of the sliding tables upon which the engraved cylinder and transfer roller are mounted.

In Figs. 1 and 5, the three rollers in the machine are shown as they are associated for the coating operation. There it is noted that the rear roller 20 is the electro or engraved brass cylinder upon which are raised the engraved characters 23 for controlling printing operations when the cylinder is finished by etching after the present preparing operation. The intermediate roller 21 is of hard rubber or plastic of a similar nature and is used to transfer the coating material or ink from a supply roller 22 to the engraved cylinder 20. Roller 22 is made of soft rubber or a similar plastic. The purpose of the mechanism which is to be described is to so rotate and reciprocate these three rollers 20, 21 and 22 with respect to each other that the coating material is spread over the surface of the raised characters 23 and also wiped against the side walls of said characters in all directions, so that a character covering or coat is applied rapidly by operation of the machine.

One coating material found suitable for the purpose is a photoengraving ink #GY70916 produced by the Charles Helmuth Printing Ink Corp. Some linseed oil may be added to get the desired consistency.

Turning to Fig. 2, it is seen that the mechanism is mounted in and on a cabinet with a pair of side walls 27 and 28 and a top 29 which forms a base for most of the mechanism for supporting and operating the three rollers. The cabinet is provided with a shelf 30 upon which rests the two small operating motors M2 and M3 for reciprocating the engraved and supply rollers, respectively. On the base 31 of the cabinet is supported the main operating motor M1 which is used to drive rotating gearing with direct connections to the engraved cylinder and transfer roller, said motor also having indirect operative effect on the supply roller through frictional contact between the transfer roller and supply roller. All three rollers receive reversible rotative action from this main driving source M1.

Attached to the shaft of motor M1 is a small pulley 34 around which is drawn a belt 35, the upper end of which passes over a large pulley 36 fastened to a shaft 37 pivoted in a pair of bearing supports 38 and 39 fastened to a plate 40 which in turn is secured to the shelf 30. Attached to the right end of shaft 37 is another small pulley 42 which is the driving means for the belt 43 which passes through an opening 44 (Fig. 1) in the main base 29 and is carried around a larger pulley 45 secured to a short drive shaft 46. It will be noted that the two driving connections through the belts 35 and 43 are proportioned to reduce the speed of operation in communicating the drive from the motor M1 to the shaft 46.

Shaft 46 is pivoted in a pair of bearing supports 48 and 49 fastened to the base 29 and spaced apart to receive between them a drive gear 50 fastened to shaft 46 with pulley 45 as already mentioned. In constant mesh with gear 50 (Fig. 1) is a gear 51 on a shaft or fixed center 53 which is the driving means for the engraved cylinder roller 20. Also on shaft center 53 is another gear 52 which provides the driving means for another gear 54 (Fig. 1) which is moved in and out of mesh with gear 52 according to the position of the attached transfer roller 21 which is slidable into or out of engagement with the engraved roller 20. It will be noted that the two gears 50 and 54 are wide enough to maintain engagement with the thinner gears 51 and 52 which are mounted with the engraved roller 20 to be moved axially as the coating operation takes place. It is sufficient to note at this point that the gearing 50—54 is provided to rotate the two rollers 20 and 21. Before following the operating connections any further, it is believed best to again direct attention to the other driving means shown in Fig. 2.

The motor M2 is provided to reciprocate the support upon which the engraved roller 20 is mounted. Extending to the right of motor M2 is a housing section 57 containing speed reduction gearing and connections to a drive shaft 58 upon which is fixed a disk 59 with an offset driving center 60. Pivotally mounted on said eccentric center 60 is a link 61 extending upwardly through a notch 62 (Fig. 1) cut into the side of base 29. Link 61 is formed with a shouldered upper end which is articulated to the outer end of a bell crank 63 pivoted at 64 on a bearing block 65 fastened to the base 29. The third center 66 of bell crank 63 is pivotally connected to an extension 67 fastened to the side of the right bearing support 68 for the electro driving center shaft 53 already mentioned. Before going any further into an explanation of the driving connections to the electro roller, consideration is given to the driving connections to the ink supply roller 22.

In Fig. 2 it is noted that the third motor M3 is provided with an extension 70 containing speed reduction gearing and connections to a shaft 71 upon which is fastened a driving plate or disk 72 with an offset driving stud 73. Articulated upon stud 73 is the lower end of a link 74, the upper end of which extends through an opening 75 (Fig. 1) cut into base 29. The top end of link 74 is pivotally mounted at 76 on the end of a bell crank 77 which rocks on a center 78 extending through a bearing 79 fastened to the top of base 29. The bell crank 77 has a third pivot 80 to which is attached the reduced end of a shaft 81 which projects through the holding means for the ink supply roller 22.

Figure 4:
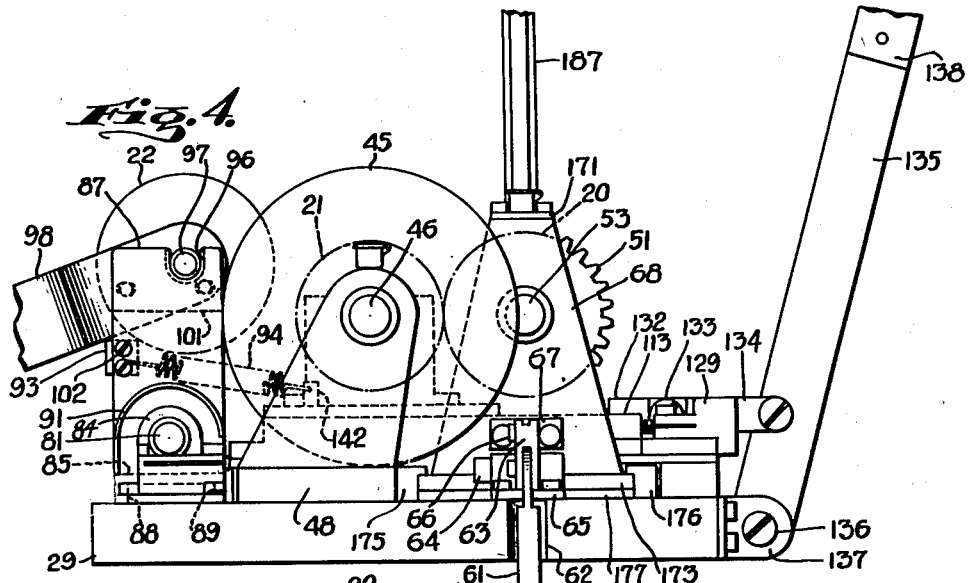
Fig. 4 is a side elevation view showing the mounting means for the three rollers and the operating handles for shifting and removing the rollers.

Referring to Fig. 2, it is seen that shaft 81 extends to the right and passes through a pair of angular support bearings 83 and 84. Between the two bearings, a bail is attached to the shaft 81 for the purpose of supporting the supply roller 22. The bail is formed with a cross bar 85 and a pair of vertical side arms 86 and 87, said arms having affixed thereon hubs which are fastened to the shaft 81. Extending below the bottom of cross bar 85 is a pair of stop studs for limiting the swinging angle of the bail arms 86 and 87. A long stud 88 limits the forward movement of the top of the bail and a short stud 89 (Fig. 4) limits the rearward movement of the supply roller.

Attached to the sides of the bail arms 86 and 87 are a pair of arcuate guards 91 to cover the space between the bail and the two bearing supports 83 and 84, said space being opened and closed on both sides alternately by the reciprocating action of shaft 81, said guards preventing any pinching of fingers between the bail and the bearing supports. Extending across the front of the bail is a bar 93 which acts as an attaching means for a spring 94 which tends to draw the supply roller 22 toward the transfer roller 21. The top ends of the bail arms 86 and 87 are formed with notches 96 (Fig. 4) into which are inserted two trunnions 97 extending from the sides of the supply roller frame 98. In Fig. 1, it is seen that this frame 98 is formed as a bail with a centralized handle 99 having two extending arms 98 between which is pivotally supported the roller 22, the shaft of which extends to form the trunnions 97 proportioned to fit into the notches 96 (Fig. 4) formed in the top of the operating bail 85, 86 and 87. Attached by screw and slot connections to the left hand arm 86 of the supporting bail is an adjustment plate 101 which is formed with a notch 96' for engaging the left trunnion 97 of the supply roller 22 to vary the axial angularity of the supply roller 22 to agree with the setting of the transfer roller 21.

From the foregoing, it is apparent that between the ink supply roller 22 and the operating bail 86, 87 there is provided a readily removable connection. Such construction is provided because frequent removal of the supply roller 22 is resorted to in order to replenish the coating fluid supplied thereby. The handle 99 is grasped by one hand and the supporting bail is drawn forward away from the transfer roller 21 by the other hand pulling one or the other of two extending pins 102, and then the frame 98 is lifted to carry the supply roller away from the machine. In order to recoat the supply roller 22 with fresh coating of ink, it is rolled over a pad saturated with such material before being again dropped into the notches 96 and 96' and allowed to press against the transfer roller 21.

The spring 94 (Fig. 4) is not depended upon entirely to cause contact between the supply roller 22 and the transfer roller 21. The operator can exercise further control by manipulating the handle 99 and frame 98 to press the supply roller 22 against roller 21. The operating bail 85, 86 and 87 not only forms a rocking support but serves further to communicate the axial reciprocating movement of shaft 81 to the supply roller 22, so that the coating material is spread along the transfer roller surface from side to side as the supply roller moves back and forth with respect to the periphery of the transfer roller. Because the two rollers 21 and 22 are of different diameters, there is no repetitious blanking out of the same contacting areas.

In Fig. 2, it is noted that the motion of the supply roller 22 already mentioned is communicated from the eccentric 73 which revolves to reciprocate link 74 vertically and thereby rock the crank 77 and pull shaft 81 back and forth to reciprocate the bail and supply roller.

Figure 6:
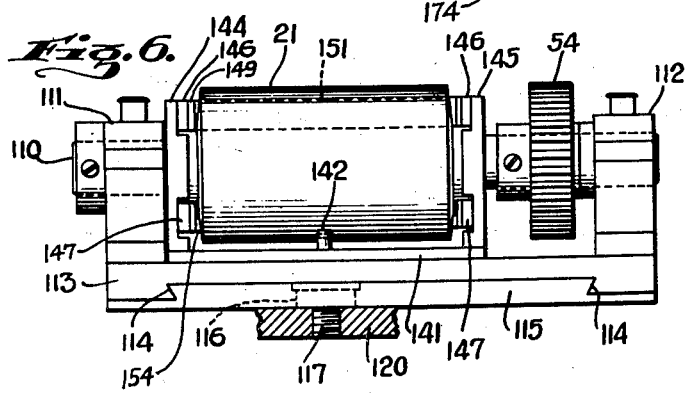
Fig. 6 is a front elevational view of the transfer roller and the mounting means therefor on the sliding support plate.

Turning now to the means for mounting the intermediate transfer roller, it is believed these parts are best shown in Figs. 1 and 6. The transfer roller 21 is mounted on a shaft 110 which projects through a pair of bearing standards 111 and 112 supported upon and fastened to a sliding plate 113. In Fig. 6 it is seen that slide plate 113 is formed with a pair of dove-tail guideways 114 cooperating with matching formations on a pivotally mounted supporting base or plate 115. The plate 115 has a circular recess 116 to receive the shouldered head of a large screw 117 which acts as a pivot for the base plate 115 and the entire transfer roller supporting means. It is by this means that the entire transfer roller assembly is made adjustable relative to engraved cylinder roller 20, so that perfect alignment may be insured at the contact line between the two rollers. Stud 117 is screwed into an intermediate base plate 120 which is noted in Fig. 5 to be secured to the top of the main base 29.

Referring to Fig. 1, it is seen that two screws 125 and 126 cooperate with the front edge of the pivoting base plate 115 to vary the angular relationship between the entire transfer roller carriage and the remainder of the machine. Screws 125 and 126 are seen to be threaded horizontally through the bearing blocks 83 and 84, respectively, already mentioned as the supporting means for the supply roller. The heads of the screws are scribed with radial lines to control adjustment from reference indicia. These two screws 125 and 126 are seen to engage the front edge of plate 115 on opposite sides of a center line through the pivoting center screw 117 which is the point of reference for angular adjustment and which coincides with a point directly beneath the center of the axis line of the transfer roller 21. By tightening and loosening one or the other of the two screws 125 and 126, it will be apparent that the line of contact between the transfer roller 21 and the electro roller 20 may be adjusted to agree with the position in which the electro is found. Thus, the transfer roller surface is brought around to coincide exactly with a straight line of contact between it and the electro. Of course, whatever the adjustment of the transfer roller 21 might be, the supply roller 22 is settable by plate 101 so that it is possible for it to conform therewith.

Two other screws 123 and 124 cooperate with the rear edge of slide plate 113 and are mounted in blocks 128 and 129, respectively, fastened to the main base 29. These screws are also varied in position to act as adjustable stops for the transfer roller carriage. Since support plates 113 and 115 are adjusted angularly in a horizontal plane, the ends of screws 123 and 124 are set to project varying amounts so that together they form a rigid stop to limit the retraction of the slide plate 115.

Turning now to the means for sliding the transfer roller carriage, it is noted in Fig. 1 that the sliding support plate 113 has secured thereon a bracket 132 with a pivot 133 for one end of a link 134, the other end of which is pivotally connected to an operating lever 135 for varying the position of the transfer roller with respect to the engraved cylinder. The lever 135 (Fig. 4) is pivoted at 136 on a fulcrum bracket 137 secured to the rear edge of the main base 29. A handle 138 is provided on the top of lever 135 and this is grasped and used by the operator in manipulating the position of the sliding plate 113, so that the transfer roller 21 thereon may be positioned alternately in or out of contact with the engraved cylinder 20 and the ink supply roller 22 and also for disengaging the transfer roller while the cylinder is removed. The usual procedure is to pull the lever 135 forward in the initial part of the inking operation, whereby the transfer roller is disengaged from the electro roller 20 while the transfer roller 21 is in engagement with the supply roller 22 and receiving the coating fluid therefrom. After the transfer roller has received a sufficient amount of coating material, the lever is then pushed to the rear to carry the plate 113 and the transfer roller mounted thereon against the electro roller, so that the coating material is transferred thereto. Spring 94 tends to make supply roller 22 follow transfer roller 21 to the rear, so that with lever 135 pushed back the three rollers are in contact and operating to spread the ink.

During most of these manipulative movements of the transfer roller carriage, the driving gear 54 (Fig. 1) thereon remains in engagement with the operating gear 52, so that the transfer roller 21 is rotated for both operations of reception of the coating fluid and transferal of the coating fluid. However, if the operating handle 138 is pulled forward far enough, the gearing is disengaged so that the transfer roller is made stationary at the operator's discretion.

In Fig. 6, it is seen that a thin plate 141 is secured to the top of the sliding base 113 and carries a stud 142 which is the attaching means for the rear end of the spring 94 (Figs. 1 and 4) already mentioned as being the tensioning means tending to bring the ink supply and transfer rollers together. Upon this plate 141 is also mounted a pair of vertical supports 144 and 145 on which are pivotally mounted two pairs of ink distributing roller arms 146 and 147.

In Fig. 5, it is seen that the arms 146 are pivoted at the left on centers 149 on support 144, 145 and extend toward the right and at the right end carry between them a rod 150 upon which is a rubber roller 151 of a small diameter cooperating with the surface of the transfer roller 21. The lower pair of arms 147 are constructed in a similar fashion by being pivoted at 152 and carrying a rod 153 with a roller 154. A pair of springs 155 is attached to the opposing arms of the two pairs and tends to draw the rollers 151 and 154 into cooperation with the periphery of the transfer roller 21. These two small rollers cooperate with the transfer roller for the purpose of smoothing, thinning and distributing the coating material evenly around and across the transferring part of the surface of the transfer roller, so that in passing from the supply roller to the engraved cylinder it is distributed before it reaches the engraved cylinder. The provision of the double set of rollers ensures that the distribution is even, regardless of the direction of rotation and the direction in which the transferal takes place.

Referring to Fig. 1, it is seen that the engraved cylinder 20 is mounted on an arbor 160 which is shaped with a long extension at the left and an accurately ground enlarged shoulder at the right upon which the cylinder is forced with a snug fit. The arbor is formed in its ends with tapered center point openings upon which it is mounted by means of the operating shaft center 53 already mentioned and another retractable center 161 at the left end.

It is already mentioned that the operating shaft or center 53 is supported on one bearing standard 68 and carries secured thereon the two operating gears 51 and 52. A similar standard or bearing support 163 is provided for the end of center 53 near the supporting point for the cylinder 20. Attached to center 153 near its left pointed end is an operating disk 164 which carries a projecting pin 165 that extends into an opening in the arbor 160 and thereby communicates all movement of the center 53 and the operating gearing to the electro roller. The supporting center 161 at the left end of the arbor is supported upon a pair of standards 167 and 168, the two of them being tied together by bars 169 and 170. A somewhat larger tie bar 171 is fitted across tops of standards 68 and 163 to also tie these two supports together. The standard 163 is seen to project upward through a U-shaped opening 172 in the support plates 113 and 115 for the transfer roller mounting means.

All four bearing supports 68, 163, 167 and 168 are mounted on a slidable base plate 173 best shown in Fig. 5. There it is seen that this plate 173 is fitted in an opening under base plate 115 and lies directly above the surface of the main base 29. Plate 173 is held down in position and guided by a pair of parallel guide strips 175 and 176. Fastened to the bottom of plate 173 are a series of five hardened strips 177 underlying all of the four supports, the fifth strip being centrally located. These five hardened strips overlie supporting bearings in the form of rods 178 having enlarged roller surfaces or needle bearings 174 and extending ends with which there cooperate adjustment screws 179 and 180 for raising one end or the other of the bearing rod 178 to alter the riding position of the plate 173 and the electro roller supports thereon. It is noted that the rods 178 and bearings 174 are mounted in restricted cavities in the main base 29, so that their movement is confined to rotary movement and adjustment by the screws 179 and 180.

Since all of the supports for the electro roller arbor are tied together by means of plate 173, and since this plate is fastened to the standard 68 (Fig. 1) already mentioned as being the attaching means for the block 67 to which the reciprocating linkage 61 and 63 is attached, it will be apparent from Fig. 2 that, when the motor M2 is operating and eccentric center 60 rotating, the reciprocating movement of link 61 will be communicated through bell crank 63 to the entire supporting means for the electro cylinder or roller 20, and this roller will be reciprocated continuously during the reinking operation.

Of course, since the gear connections between gears 50 (Fig. 1) and gear 51 are maintained in all positions of reciprocation, the electro roller will be rotated in both directions during all of the reinking operation.

In order that the arbor 160 (Fig. 1) may be removed, the center 161 is made manually retractable to be disengaged from the arbor far enough to permit its removal. Turning to Fig. 2, it is seen that the center 161 is formed with a shoulder 183 which slides in a cylinder 184 which also contains a coil spring 185. The cylinder 184 is fastened to the inner side of standard 168. The coil spring 185 presses between the wall of standard 168 and shoulder 183 and normally tends to extend the center 161 toward the right and into the operating position. However, the center extends through standard 168 and has a reduced portion at its left end upon which is a pivot 186 to which is pivotally attached the bottom of a hand operated lever 187. This lever 187 is fulcrumed at 188 on a bracket 189 fastened to and extending from the standard 168. When lever 187 is grasped and rocked by hand in a clockwise direction (Fig. 2), the center 161 is retracted so that arbor 160 may be removed along with the electro roller 20.

Figure 8:
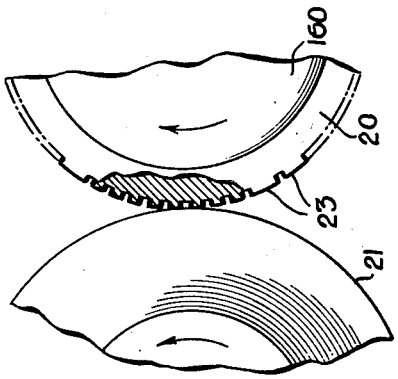
Fig. 8 is a detail view of the engraved cylinder and cooperating transfer roller showing the periphery of the cylinder in section to illustrate the wiping application of the coating fluid from the transfer roller to the raised areas and side walls of the printing areas on the cylinder.
Figure 7:
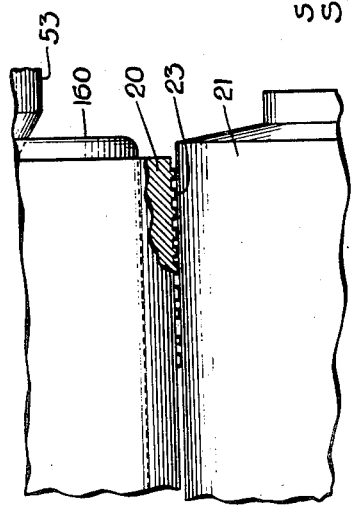
Fig. 7 is a detail view partly in section to show in exaggerated detail the application of the coating fluid to the raised surfaces and side walls of the printing areas on the engraved cylinder.

The diameters of rollers 20 and 21 and the pitch circles of gears 52 and 54 are so proportioned that the surface of roller 20 is moved at a slower rate than the cooperating surface of the ink transfer roller 21 (Figs. 7 and 8). As a result, the ink is applied with a wiping action in all directions by the transfer roller.

Means are provided for automatically reversing the direction of operation of motor M1 which, it will be remembered, is the motor for the main driving connections for rotating the electro transfer rollers. Of course, since the supply roller is at times in contact with the transfer roller, it will partake of the motion of the transfer roller and be reversed in direction also because of the frictional contact therewith. Reversal is brought about at uniform intervals by utilizing the reciprocating movement of the frame carrying the electro roller 20.

In Figs. 1 and 2, it is seen that attached to the left side of the left standard 168 is an angular member 191 carrying thereon a pawl 192 pivoted on a center 193. This pawl cooperates with a ratchet wheel 194 (Fig. 3) attached to a cam 195 loosely pivoted on a fixed center shaft 196 mounted on a bracket 197 (Fig. 1) fastened to a plate 198 carrying a set of contacts for controlling the reversal. These contacts are also mounted on a bracket 200 and comprise a central contact leaf 201 with an insulation strip 202 cooperating with the periphery of cam 195. Two other contact leaves are provided and have normally closed contact points 203 and a second set of normally opened contact points 204. In Fig. 3, it is seen that the periphery of cam 195 is so shaped as to allow the central contact leaf 201 to assume a normal position for half the number of operations wherein a low contour of the cams permits normal closure of contacts 203. However, when the high portion of cam 195 cooperates with the insulation strip of the central contact leaf 201, the leaf is pushed to the right in Fig. 1 and contacts 204 are closed and the normally closed contacts 203 are opened.

Fastened to the fixed shaft 196 is an arm 207 alongside the ratchet wheel 194 and carrying a retaining pawl 208 pivoted at 209 on the arm. A spring 210 holds the retaining pawl in constant cooperation with the ratchet wheel 194 so that, when the operating pawl 192 is retracted, the ratchet wheel is held in the advanced position. A hook-shaped support 211 is provided on plate 198 to act as the holding means for the upper end of spring 210.

Figure 9:
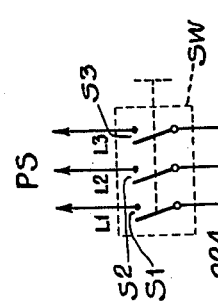
Fig. 9 is a wiring diagram showing the wiring connections to the three motors and the reversing connections to the main operating motor.

In Fig. 9, there are shown the electrical connections between the power source PS, the main switch SW, the three motors M1, M2 and M3, the automatic reversal switch ARS and the reversing contacts 203 and 204.

The two motors M2 and M3 are connected directly to the power source through the switch SW. When the switch SW is closed, a circuit is set up for both motors through line L1, the blade S1 of the switch, wire 224, wire 225, and parallel connections to the motors M2, M3, wire 226 from motor M2 and a parallel wire 227 from motor M3 connected to wire 228, wire 229 connected to the switch blade S2, and line L2 to the power source PS.

The wiring connections to the motor M1 are not wired directly from the power source PS but pass through a standard automatic reversing switch ARS containing contacts shifted by magnets C1 and C2 which are energized alternately by the reversing switch contacts 203 and 204.

When the reversing contacts are positioned with the contacts 203 closed as shown and switch SW is closed, the circuits to the three terminals of motor M1 are connected as follows: from the terminal T1, wire 231 connects to a normally open contact 221a and also by means of wire 232 it is in series with the presently closed contact 220a. From the opposite side of contacts 220a there extends a wire 233 connected to wire 229 leading to switch contacts S2 and line L2. Terminal T2 of motor M1 has connections including wire 235, 236, contacts 220b, wires 237 and 224, and switch contacts S1 to line L1. The third terminal T3 has connections including wires 239, 240, contacts 220c, wires 241 and 242, and switch contacts S3 to line L3. The connections to the motor M1 as described are provided due to the closure of contacts 220a, 220b and 220c by the energization of magnet C1 upon the closure of contacts 203 and the temporary effectiveness of the following circuit: line L3, switch contacts S3, wires 242 and 241, wire 244, the central contact blade, normally closed reversal contacts 203, wire 245, magnet C1, wires 246, 233 and 229, and switch contacts S2 to line L2.

After the operation of a number of electro roller reciprocations and concurrent operation of the ratchet mechanism connected to cam 195, the cam shifts the central reversal blade to open contacts 203 and disable magnet C1 and, at the same time, close contacts 204 to establish a reversal circuit through the other magnet C2 as follows: from line L2, through switch contacts S2, wires 229 and 248, magnet C2, wire 249, reversal contacts 204, the common contact blade, wires 244, 241 and 242, switch contacts S3, and line L3. Then, when magnet C2 is effective, the associated contacts 221a—221c are closed and motor M1 is operated in the reverse direction by the circuits passing through the contacts as follows: terminal T1, instead of being connected to line L2, is connected to line L1 by the connections including line L1, switch contact S1, wire 224, contacts 221a, wire 231 and terminal T1. Terminal T2 of the motor instead of being connected to line L1 is reversed to be connected to line L2 as follows: from line L2, through switch contacts S2, wire 229, contacts 221b, wire 235 and terminal T2. The terminal T3 of motor M1 remains connected to the line L3 but is so connected through different contacts under the influence of magnet C2 as follows: from line L3, through switch contacts S3, wire 242, contacts 221c, and wire 239 to terminal T3.

It will be noted in Figs. 3 and 9 that the cam 195 which is controlling for reversal operation is evenly proportioned for equal periods of reversal timing. This is done so that the amount of coating fluid applied in one direction is equal to the amount applied in the other direction. It is apparent that in a similar fashion the reciprocating eccentrics shown in Fig. 2 move the supply and electro rollers equally in both directions of reciprocation, so that here again the coating fluid is applied equally in both directions in uniform periods, so that the amount automatically applied to the sides of the raised engraved areas can be regulated far more effectively than when applied by hand, so that the ink creeps down the side walls of the raised electro surfaces equally in all directions.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine for applying a coating to an engraved printing cylinder, means for pivotally mounting said cylinder, a transfer roller, means for pivotally mounting said roller in cooperation with the surface of said cylinder, means for applying coating material to said transfer roller, a driving means, separate driving connections from said driving means to said pivotal mounting means of said cylinder and said transfer roller, said separate driving connections being so proportioned to said cylinder and roller that each is driven at a different peripheral speed, whereby said coating material is applied with a wiping action from said transfer roller to said cylinder.

2. In a machine for coating an engraved cylinder, means for pivotally supporting said cylinder, a transfer roller for cooperating with said cylinder, a pivotal supporting means upon which said roller is held, a slide upon which said supporting means is held, means for moving said slide to bring said rollers in and out of contact with said cylinder, a pivoted plate upon which said slide is supported, and a base upon which said plate is pivoted.

3. The combination set forth in claim 2 with adjusting means for the pivoted plate for varying the angle of operation of said slide and the angle of contact between the roller and cylinder, and a plurality of adjustable stopping means for limiting the movement of said slide in any of the several angular positions.

4. In a machine for coating an engraved cylinder, a coating transfer roller for cooperating with said cylinder, means for applying coating material to said roller, means for rotating said cylinder and roller in contact with each other, and means for reversing the direction of operation of said rotating means at regular intervals.

5. In a machine for coating an engraved cylinder, means for pivotally supporting said cylinder, a removable coating supply roller, said roller having extending trunnions, a frame on which said roller is pivotally supported, said frame having a centralized handle, a flexible supporting means for said roller, a coating transfer means between said roller and said cylinder and contacting therewith, said supporting means being adapted to receive said trunnions and be moved by said handle to bring said roller into and out of contact with said transfer means at varying angles.

6. The combination set forth in claim 5 with means for reciprocating said supporting means to reciprocate said roller axially, whereby coating material is spread evenly over the transfer means by said roller.

7. In a machine for applying a coating to an engraved cylinder, means for rotatably mounting said cylinder, a driving means with gearing for rotating said cylinder mounting means, a transfer roller, means for pivotally mounting said transfer roller, gearing on said pivotal mounting means and meshing with said drive gearing for rotating said transfer roller, a slidable support upon which said transfer roller mounting means is held, manipulative means for shifting said slidable support to bring said transfer roller into and out of engagement with said cylinder and into and out of engagement with said drive gearing, adjustable stops for limiting the movement of said slidable support in any of a number of angular directions, a secondary pivotal support upon which said slidable support is pivotally mounted, adjusting means for varying the angle of said secondary transfer roller support with respect to said cylinder for varying the angle of cooperation between the roller and the cylinder, a common base upon which said secondary support is mounted, a removable coating supply roller, a frame upon which said supply roller is supported and swung into and out of cooperation with said transfer roller, a spring drawing said frame in a direction tending to bring the supply roller into cooperation with the transfer roller, a handle on said supply roller for swinging said frame to disengage the supply roller for removal, and means for reciprocating said frame, whereby said supply roller is reciprocated axially while in contact with said transfer roller to spread the coating material applied thereby evenly across the periphery of the transfer roller.

LAWRENCE B. CORBETT.

REFERENCES CITED

The following references are of record in the file of this patent:

UNITED STATES PATENTS

| Number | Name | Date |
|---|---|---|
| 574,206 | Miehle | Dec. 29, 1896 |
| 710,693 | Hooley | Oct. 7, 1902 |
| 824,455 | Waechter | June 26, 1907 |
| 884,872 | Sixt et al. | Apr. 14, 1908 |
| 956,316 | Droitcour | Apr. 26, 1910 |
| 984,991 | Albert | Feb. 21, 1911 |
| 2,006,364 | Morse | July 2, 1935 |
| 2,133,516 | Huebner | Oct. 18, 1938 |
| 2,148,558 | Huebner | Feb. 28, 1939 |
| 2,212,234 | Henderson | Aug. 20, 1940 |
| 2,213,712 | Marshall | Sept. 3, 1940 |
| 2,287,426 | Hageman | June 23, 1942 |
| 2,366,411 | La Hatte et al. | Jan. 2, 1945 |
| 2,380,322 | Marquardt | July 10, 1945 |